US007499073B2

(12) United States Patent
Hladik et al.

(10) Patent No.: US 7,499,073 B2
(45) Date of Patent: Mar. 3, 2009

(54) OPTICAL DISC AND METHOD OF LABELING THE SAME

(75) Inventors: Molly L. Hladik, Corvallis, OR (US); Susan E. Bailey, Corvallis, OR (US); Paul J. McClellan, Corvallis, OR (US); David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 6 days.

(21) Appl. No.: 11/788,304

(22) Filed: Apr. 18, 2007

(65) Prior Publication Data

US 2008/0259152 A1 Oct. 23, 2008

(51) Int. Cl.
*G11B 7/252* (2006.01)

(52) U.S. Cl. .................................................. 347/262

(58) Field of Classification Search ................ 347/224, 347/225, 262, 264

See application file for complete search history.

(56) References Cited

U.S. PATENT DOCUMENTS

| | | | | |
|---|---|---|---|---|
| 6,731,592 | B2 * | 5/2004 | Usami | 369/286 |
| 7,015,939 | B2 | 3/2006 | Honda | |
| 7,148,182 | B2 | 12/2006 | Field et al. | |
| 7,172,991 | B2 | 2/2007 | Anderson | |
| 7,198,834 | B2 | 4/2007 | Gore | |
| 2005/0239650 | A1 | 10/2005 | Field et al. | |
| 2005/0243689 | A1 | 11/2005 | Van Brocklin et al. | |
| 2005/0265156 | A1 | 12/2005 | Nakane et al. | |
| 2006/0125666 | A1 | 6/2006 | Hanks | |
| 2006/0156175 | A1 | 7/2006 | McClellan et al. | |
| 2006/0215523 | A1 | 9/2006 | Park | |
| 2006/0227680 | A1 | 10/2006 | Bahng | |
| 2006/0228515 | A1 | 10/2006 | Kwasny et al. | |
| 2006/0244811 | A1 | 11/2006 | No | |
| 2006/0256677 | A1 | 11/2006 | Bahng | |
| 2006/0262334 | A1 | 11/2006 | Kaneshiro et al. | |
| 2006/0262660 | A1 | 11/2006 | Han | |
| 2006/0290985 | A1 | 12/2006 | Kim | |
| 2007/0014964 | A1 | 1/2007 | Hsiao et al. | |

FOREIGN PATENT DOCUMENTS

| | | | |
|---|---|---|---|
| EP | 1705648 | A2 | 9/2006 |
| EP | 1705658 | A2 | 9/2006 |
| EP | 1720165 | A2 | 11/2006 |
| JP | 2000-230061 | * | 8/2000 |
| WO | 2005-083712 | A1 | 9/2005 |
| WO | WO 2005/108102 | A1 | 11/2005 |
| WO | WO 2006/110361 | A1 | 10/2006 |
| WO | WO 2006/134548 | A2 | 12/2006 |

OTHER PUBLICATIONS

International Search Report for Patent Application PCT/US2008/060350; Jul. 29, 2008.

* cited by examiner

*Primary Examiner*—Huan H Tran

(57) ABSTRACT

An optical disc has a first plate, a second plate adhered to the first plate, and an optically-activated colorant disposed between the first and second plates.

20 Claims, 5 Drawing Sheets

OPTICAL DISC AND METHOD OF LABELING THE SAME

BACKGROUND

Personal computers typically include an optical disc drive capable of reading data from and writing data to an optical disc. Any type of data may be stored on an optical disc, for example, computer programming, electronic application files, audio files, image files, video files, etc.

Because of the wide variety of data that may be recorded on an optical disc, it is the general practice to produce a label for the disc that indicates what type of data or specific content is stored on the disc. Consequently, an optical disc may have a data side on which the disc drive reads and writes data and an opposite label side on which labeling for the disc or its contents may be disposed.

In the past, optical discs have been labeled by the user writing directly on the label side of the disc or by producing an adhesive label that could be adhered to the label side of the disc.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
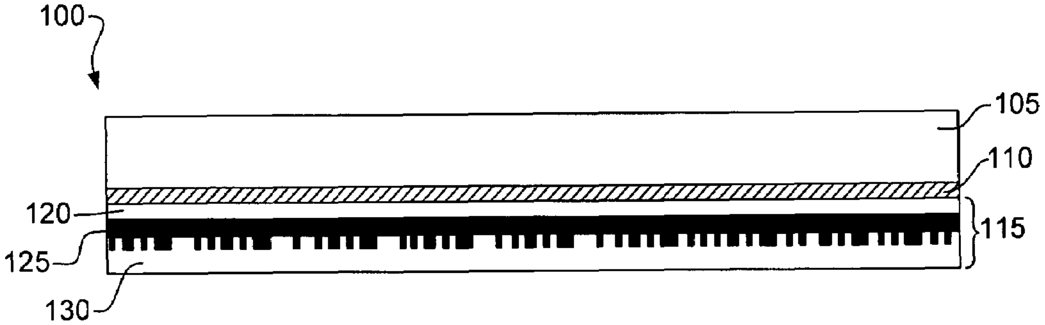
FIG. 1 is a cross-sectional diagram of an exemplary optical disc, according to principles described herein.

Some optical disc drives produced for use with personal computers, in addition to being able to record data on the data side of an optical disc, now come equipped with the capability to write labels on the label side of an optical disc. This labeling is accomplished using special optical discs having an optically-activated colorant coated on the label side of the optical disc. The optically-activated colorant becomes visibly altered when light having a wavelength within a certain range of wavelengths and/or intensity is incident on the colorant. By selectively focusing the laser in the optical disc drive on the optically-activated colorant of the label side of an optical disc, customized labels may be produced with relative ease and economy.

One particular type of optical disc is the Digital Video (or Versatile) Disc ("DVD"). One-sided recordable DVDs are generally fabricated from two polycarbonate plates that are adhered together. One of the plates generally includes a metal data layer. When a label is formed on such a DVD using an optically-activated colorant, the label is formed on the outer face of the other polycarbonate plate. Thus, the full width of the second polycarbonate plate is disposed between the label and the metal data layer.

In contrast to a DVD, a Compact Disc ("CD") generally has a single plate with a metal data layer disposed just under the label surface. Consequently, a label disposed on the label surface of the CD has minimal spacing between the label and the metal data layer.

Due at least in part to these compositional differences, labels created on DVDs using a coating of optically-activated colorant typically exhibit poorer contrast characteristics than labels similarly created on other optical discs, such as CDs. An increased holographic effect, created by the DVD label being further away from the metal data layer on a DVD than on a CD, causes a reduced contrast in the label of the DVD.

Additional problems faced by optical discs having one-sided optically-activated colorant coatings include tilt, fingerprinting, and ablation. Tilt occurs when moisture is absorbed at uneven rates on the data and label surfaces of the optical disc, thus causing the disc to become warped or unbalanced. Tilt may compromise the integrity of data on an optical disc. Fingerprinting occurs when the colorant coating on the label side of a disc absorbs oil from a user's skin that causes the coating to alter. Ablation occurs when a laser writing to the colorant coating is powerful enough to move the colorant coating out of track or off of the disc. Ablation may contaminate optical pick up units, diminish laser power, and eventually cause an optical disc drive to fail.

To overcome these and other issues, the present specification discloses apparatus, methods, and systems relating to an optical disc having two plates adhered together and an optically-activated colorant disposed between the two plates. As will be shown, the optical disc of the present specification exhibits improved label contrast, tilt, fingerprinting, and ablation characteristics over optical discs having the optically-activated colorant coated on an exterior face.

As used in the present specification and in the appended claims, the term "optical disc" or "optical disc media" refers to any such media on which data is recorded optically or from which data is read optically. Examples of an optical disc include, but are not limited to, compact discs (CDs), digital video discs (DVDs), laser discs, and other digitally-encoded optical discs. These examples including CD-ROM discs, writeable and erasable compact discs, video game discs, etc.

As used in the present specification and in the appended claims, the term "optically-activated colorant" refers to a colorant, such as a dye, pigment, or other color imparting material, that is visibly altered by exposure to light, especially of a specific intensity, duration, and/or wavelength. A visible alteration as defined herein may include, but is not limited to, a change in opacity, transparency, color/hue, or brightness.

As used in the present specification and in the appended claims, the term "light" refers to electromagnetic radiation visible to the human eye, in addition to electromagnetic radiation defined as having an infrared or ultraviolet wavelength.

As used in the present specification and in the appended claims, the term "label" and its derivatives refer to a visual feature on an optical disc that serves a primarily aesthetic purpose or that serves to visually indicate to a human viewer the content, type or other characteristic of the disc. Such labels may include, but are not limited to, graphics and/or text. It will be understood that the term "label" and its derivatives refers to data that a human user can visually apprehend on an optical disc without the aid of a computer or optical disc drive, as opposed to the data on the optical disc that is written or readable by an optical disc drive and intelligible to a human being with the aid of a computer and optical disc drive. The term "labeling an optical disc" and its derivatives refer to the process by which a label is created on an optical disc.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical discs, exemplary systems for labeling optical discs, and exemplary methods of fabricating and labeling optical discs.

Exemplary Optical Discs

Referring now to FIG. 1, a cross-section of an exemplary optical disc (100) is shown. The optical disc (100) includes a first plate (105) adhered to a second plate (115). The first plate (105) is substantially transparent. In some embodiments, the first plate (105) may include a polycarbonate material. The plates (105, 115) may include a substantially circular face geometry and both plates may include a substantially congruent geometry such that the first plate (105) may be superimposed upon and adhered to the second plate (115) to create the optical disc (100).

The second plate (115) includes an optical data storage medium (125) between first and second transparent layers (120, 130) of polycarbonate material or lacquer. The optical data storage medium (125) may include a metal layer in which physical pits are or can be formed to represent digital data, e.g., video data. Reflections from a laser beam of an optical disc drive shined on the optical data storage medium (125) may be measured and interpreted to retrieve the digital data from the optical disc (100) as the optical disc (100) is rotated.

The first and second plates (105, 115) may be adhered together by an adhesive layer (110) disposed between the first and second plates (105, 115). The adhesive layer includes an adhesive material having an optically-activated colorant configured to respond to light having a specific wavelength range from a laser beam selectively directed through the first plate (105), e.g., the laser of an optical disc drive. The light received through the first plate (105) by the optically-activated colorant will visibly alter the colorant. Consequently, if the light is selectively directed to particular portions of the optically-activated colorant layer, a desired label for the optical disc (100) can be formed in the optically-activated colorant layer which will be visible through the exterior face of the first plate (105).

In some embodiments, the optically-activated colorant may become more opaque when the light from the laser beam is directed to the colorant. In such embodiments, the laser may be selectively directed at particular portions of the adhesive layer (110) to create a corresponding label pattern that contrasts with the metal optical data medium (125) as seen through the substantially transparent first plate (105), the portions of the adhesive layer wherein the optically-activated colorant has not been activated, and the first transparent layer (120) of the second plate (115).

Labels made by selectively shining a laser through the first plate (105) and onto the adhesive layer (110) of the optical disc (100) may exhibit improved contrast characteristics over other optical discs, such as optical discs having the optically-activated colorant on the external face of the first plate (105). This improvement may exist due to a reduced distance between the optically-activated colorant and the metal optical data storage medium (125) of the second plate (115) contributing to less of a holographic effect from the optical data storage medium (125).

As noted above, in some embodiments, the optically-activated colorant may become more opaque when the laser beam is shined on the colorant. In such embodiments, the areas of the colorant in the adhesive layer not activated by the laser beam may remain relatively transparent. In other embodiments, the colorant may become more transparent when activated by the laser beam, and the unaffected areas of colorant may remain relatively opaque.

An optical disc (100) having the optically-activated colorant in the adhesive layer (110), as opposed to having the optically-activated colorant on the exterior face of the first plate (105), may eliminate ablation or fingerprint concerns as the optically-activated colorant is not exposed to such factors on the outer surface of the optical disk (100).

Furthermore, the optical disc (100) of the present specification may have moisture absorption characteristics on the exterior surfaces of the first and second plates (105, 115) that are significantly more even than discs with exterior labeling layers. Consequentially, tilt or warping concerns with the optical disc (100) are significantly reduced or eliminated.

Additionally, it should be understood that a plurality of optically-activated colorants may be used in conjunction with the optical disc (100) of the present specification. In some embodiments, a plurality of optically-activated colorants having different colors may be used together in the adhesive layer (110) of the optical disc (100) so that a full color label can be produced. In one such embodiment, each of the optically-activated colorants may be visibly altered by a different wavelength of light, thus providing the capability of colored labels with composite primary colors on the optical disc.

In some embodiments, the optically-activated colorant(s) may vary in visible alteration depending on the intensity of the light incident on the colorants. This characteristic may provide for different shading schemes in labels produced on an optical disc (100) of the present specification.

According to one exemplary embodiment, the optically-activated colorant(s) may include a number of components forming two separate phases configured to be imaged by one or more lasers emitting radiation at a known range of wavelengths and intensities. According to one exemplary embodiment, the two separate phases forming the present optically-activated colorant(s) include, but are in no way limited to, a radiation-curable polymer matrix with acidic activator species dissolved therein and a low-melting eutectic of a leucodye insoluble in the matrix but uniformly distributed therein as a fine dispersion. Additionally, the optically-activated colorant(s) can include an antenna dye or other laser radiation absorbing species uniformly distributed/dissolved in at least one and preferably both phase(s) of the optically-activated colorant(s). Each of the present phases will be described in detail below.

As mentioned, the first phase of the optically-activated colorant(s) includes, but is in no way limited to, a radiation-curable polymer matrix with acidic activator species dissolved therein. According to one exemplary embodiment, the radiation curable pre-polymer, in the form of monomers or oligomers, may be a lacquer configured to form a continuous phase, referred to herein as a matrix phase, when exposed to light having a specific wavelength.

Traditional radiation curable polymers forming a first phase of the optically-activated colorant(s) are made of mixtures of multifunctional (in most of the cases di-functional) monomers and oligomers.

According to one exemplary embodiment, examples of monomers which could be utilized in the present exemplary optically-activated colorant(s) may include, but are in no way limited to, isobornyl methacrylate, isobornyl acrylate, dicyclopentadienyl acrylate, dicyclopentadienyl methacrylate, cyclohexyl(meth)acrylate, cyclohexyl acrylate, cyclohexyl (meth)acrylate, dicyclopentanyl(meth)acrylate, tert-butyl acrylate, tert-butyl methacrylate, dicyclopentanyloxyethyl (meth)acrylate, dicyclopentenyloxyethyl(meth)acrylate, 4-tert-butylstyrene, other styrene derivatives, and the like.

Apart from the monofunctional monomer and oligomer component of the exemplary optically-activated colorant(s), a balance of the colorant(s) may be assumed by multifunctional UV-curable monomers and oligomers. Suitable radiation-curable colorant formulations may include, by way of example, multifunctional UV-curable monomers and oligomers such as (not limited to) di and tri-functional acrylate and methacrylate derivatives (1,6-hexanediol diacrylate, tripropylene glycol diacrylate, ethoxylated bis-phenol-A diacrylates and so on.

To enable curing of the optically-activated colorant(s) by electromagnetic radiation the optically-activated colorant(s) also contain one or more light absorbing species, such as photoinitiators, which initiate reactions for curing of the mixture, such as, by way of example, benzophenone derivatives. Other examples of photoinitiators for free radical polymerization monomers and oligomers include, but are not limited to, thioxanethone derivatives, anthraquinone derivatives, acetophenones, benzoine ethers, and the like.

Matrices based on cationic polymerization resins may require photoinitiators based on aromatic diazonium salts, aromatic halonium salts, aromatic sulfonium salts and metallocene compounds. A suitable lacquer or matrix of optically-activated colorant(s) may also include Nor-Cote CLCDG-1250A (a mixture of UV curable acrylate monomers and oligomers) which contains a photoinitiator (hydroxyl ketone) and organic solvent acrylates, such as, methyl methacrylate, hexyl methacrylate, beta-phenoxy ethyl acrylate, and hexamethylenediol diacrylate. Other suitable components may include, but are not limited to, acrylated polyester oligomers, such as CN293 and CN294 as well as CN-292 (low viscosity polyester acrylate oligomer), trimethylolpropane triacrylate commercially known as SR-351, isodecyl acrylate commercially known as SR-395, and 2(2-ethoxyethoxy)ethyl acrylate commercially known as SR-256, all of which are commercially available from Sartomer Co.

Additionally, a number of acidic developers may be dispersed/dissolved in the present optically-activated colorant (s). According to one exemplary embodiment, the acidic developers present in the optically-activated colorant(s) may include a phenolic species capable of developing color when reacting with a leuco dye and soluble or partially soluble in the optically-activated colorant(s). Suitable developers for use with the present exemplary system and method include, but are in no way limited to, acidic phenolic compounds such as, for example, Bis-Phenol A, p-Hydroxy Benzyl Benzoate, Bisphenol S (4,4-Dihydroxydiphenyl Sulfone), 2,4-Dihydroxydiphenyl Sulfone, Bis(4-hydroxy-3-allylphenyl) sulfone (Trade name—TG-SA), 4-Hydroxyphenyl-4'-isopropoxyphenyl sulfone (Trade name—D8). The acidic developer may be either completely or at least partially dissolved in the optically-activated colorant(s).

The second phase of the present exemplary two-phase optically-activated colorant(s) is a color-former phase including, according to one exemplary embodiment, a leuco-dye and/or leuco-dye alloy, further referred to herein as a leuco-phase. According to one exemplary embodiment, the leuco-phase is present in the form of small particles dispersed uniformly in the exemplary optically-activated colorant(s). According to one exemplary embodiment, the leuco-phase includes leuco-dye or alloy of leuco-dye with a mixing aid configured to form a lower melting eutectic with the leuco-dye. Alternatively, according to one embodiment, the second phase of the present optically-activated colorant(s) may include other color forming dyes such as photochromic dyes.

According to one exemplary embodiment, the present exemplary two-phase optically-activated colorant(s) may have any number of leuco dyes including, but in no way limited to, fluorans, phthalides, aminotriarylmethanes, aminoxanthenes, aminothioxanthenes, amino-9,10-dihydroacridines, aminophenoxazines, aminophenothiazines, aminodihydrophenazines, aminodiphenylmethanes, aminohydrocinnamic acids (cyanoethanes, leuco methines) and corresponding esters, 2(phydroxyphenyl)-4,5-diphenylimidazoles, indanones, leuco indamines, hydrozines, leuco indigoid dyes, amino-2,3-dihydroanthraquinones, tetrahalop, p'-biphenols, 2(p-hydroxyphenyl)-4,5-diphenylimidazoles, phenethylanilines, and mixtures thereof. According to one particular aspect of the present exemplary system and method, the leuco dye can be a fluoran, phthalide, aminotriarylmethane, or mixture thereof. Several nonlimiting examples of suitable fluoran based leuco dyes include, but are in no way limited to, 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-Nmethylamino)-6-methyl-7-anilinofluorane, 3-diethylamino-7-(mtrifluoromethylanilino) fluorane, 3-dibutylamino-6-methyl-7-anilinofluorane, 3-diethylamino-6-chloro-7-anilinofluorane, 3-dibutylamino-7-(o-chloroanilino) fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyln-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl], and mixtures thereof.

Aminotriarylmethane leuco dyes can also be used in the present optically-activated colorant(s) such as tris(N,N-dimethylaminophenyl) methane (LCV); tris(N,N-diethylaminophenyl) methane (LECV); tris(N,N-di-n-propylaminophenyl) methane (LPCV); tris(N,N-dinbutylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl.

Additional leuco dyes can also be used in connection with the present exemplary optically-activated colorant(s) and are known to those skilled in the art. A more detailed discussion of appropriate leuco dyes may be found in U.S. Pat. Nos. 3,658,543 and 6,251,571, each of which are hereby incorporated by reference in their entireties. Additionally examples may be found in Chemistry and Applications of Leuco Dyes, Muthyala, Ramaiha, ed.; Plenum Press, New York, London; ISBN: 0-306-45459-9, incorporated herein by reference.

Further, according to one exemplary embodiment, a number of melting aids may be included with the above-mentioned leuco dyes. As used herein, the melting aids may include, but are in no way limited to, crystalline organic solids with melting temperatures in the range of approximately 50° C. to approximately 150° C., and preferably having melting temperature in the range of about 70° C. to about 120° C. In addition to aiding in the dissolution of the leuco-dye and the antenna dye, the above-mentioned melting aid may also assist in reducing the melting temperature of the leuco-dye and stabilize the leuco-dye alloy in the amorphous state, or slow down the re-crystallization of the leuco-dye alloy into individual components. Suitable melting aids include, but are in no way limited to, aromatic hydrocarbons (or their derivatives) that provide good solvent characteristics for leuco-dye and antenna dyes used in the present exemplary systems and methods. By way of example, suitable melting aids for use in the current exemplary systems and methods include, but are not limited to, m-terphenyl, pbenzyl biphenyl, alpha-naphtol benzylether, 1,2[bis(3,4]dimethylphenyl)ethane. When used, the melting aid can comprise from approximately 2 wt % to approximately 25 wt % of the color-former phase of the optically-activated colorant(s).

According to one embodiment of the present exemplary system and method, the above-mentioned leuco-phase is uniformly dispersed or distributed in the matrix phase of the optically-activated colorant(s) as a separate phase. In other words, at ambient temperature, the leuco phase is practically insoluble in matrix phase. Consequently, the leuco-dye and the acidic developer component of the matrix phase are contained in the separate phases and can not react with color formation at ambient temperature. However, upon heating with laser radiation, both phases melt and mix. Once mixed together, color is developed due to a reaction between the fluoran leuco dye and the acidic developer. According to one exemplary embodiment, when the leuco dye and the acidic developer melt and react, proton transfer from the developer opens a lactone ring of the leuco-dye, resulting in an extension of conjugate double bond system and color formation.

According to one exemplary embodiment, the above-mentioned coating may be selectively irradiated with a laser or other radiation source to cause a desired interaction and form the desired color. According to one exemplary embodiment, the formation of the color with relatively low power lasers may also be facilitated by the present exemplary system and method by selectively sensitizing the various phases of the resulting coating to a known radiation emission wavelength via the use of an antenna dye or other radiation sensitizing material, thereby providing maximum heating efficiency. According to one exemplary embodiment, the optional antenna dyes may include any number of radiation absorbers selectively chosen to correspond with a radiation source wavelength. More specifically, the radiation absorbing antenna dye(s) may act as an energy antenna providing energy to surrounding areas of the resulting coating upon interaction with an energy source of a known range of wavelengths and intensities. Once energy is received by the radiation absorbing antenna dyes, the radiation is converted to heat to melt portions of the coating and selectively induce image formation. However, radiation absorbing dyes have varying absorption ranges and varying absorbency maximums where the antenna dye will provide energy most efficiently from a radiation source. Generally speaking, a radiation antenna that has a maximum light absorption at or in the vicinity of a desired development wavelength may be suitable for use in the present optically-activated colorant(s).

As a predetermined amount and frequency of radiation is generated by the radiation generating device of the media processing system matching the radiation absorbing energy antenna to the radiation wavelengths and intensities of the radiation generating device can optimize the image formation system. Optimizing the system includes a process of selecting components of the color forming composition that can result in a rapidly developable composition under a fixed period of exposure to radiation at a specified power.

According to one exemplary embodiment, the present two-phase radiation image-able coating with enhanced image stability may include an antenna package uniformly distributed/dissolved in at least one and preferably both phase(s) of the optically-activated colorant(s) in order to customize the resulting colorant(s) to a radiation at a specified wavelength and reduced power. According to the present exemplary embodiment, the antenna dyes included in the present optional antenna package may be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable antennas can also be used in the present exemplary system and method and are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both incorporated herein by reference.

According to the present exemplary embodiment, optional antenna dyes included in the present antenna package may be selected to correspond to a radiation generated by a known radiation generating device. According to one exemplary embodiment, the media processing system may include a radiation generating device configured to produce one or more lasers with wavelength values including, but in no way limited to, approximately 300 nm to approximately 600 nm, approximately 650 nm, approximately 780 nm, approximately 808 nm, and/or approximately 10.6 μm. By selectively matching the wavelength values of the radiation generating device(s) (110), image formation is maximized at lower power levels. According to one exemplary embodiment, the image formation using the antenna dyes may be performed at power levels as low as 5 mW and lower.

According to one exemplary embodiment, antenna dyes that may be used to selectively sensitize the above-mentioned optically-activated colorant(s) to a wavelength of between approximately 300 nm and 600 nm include, but are in no way limited to, cyanine and porphyrin dyes such as etioporphyrin 1 (CAS 448-71-5), phthalocyanines and naphthalocyanines such as ethyl 7-diethylaminocoumarin-3-carboxylate (λ max=418 nm). Specifically, according to one exemplary embodiment, appropriate antenna dyes include, but are in no way limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt (λ max=400 nm); ethyl 7-diethylaminocoumarin-3-carboxylate (λ max=418 nm); 3,3'-diethylthiacyanine ethylsulfate (λ max=424 nm); 3-allyl-5-(3-ethyl-4-methyl-2-thiazolinylidene) rhodanine (λ max=430 nm) (each available from Organica Feinchemie GmbH Wolfen), and mixtures thereof.

Non-limiting specific examples of suitable aluminum quinoline complexes can include tris(8-hydroxyquinolinato) aluminum (CAS 2085-33-8), and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH.

Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof.

Further, in order to sensitize the above-mentioned optically-activated colorant(s) to a radiation wavelength of approximately 650 nm, many indolium of phenoxazine dyes and cyanine dyes such as cyanine dye CS172491-72-4 may be selectively incorporated into one or more phases of the above-mentioned optically-activated colorant(s). Additionally, dyes having absorbance maximums at approximately 650 nm may be used including, but in no way limited to many commercially available phthalocyanine dyes such as pigment blue 15.

Further, radiation absorbing antenna dyes having absorbance maximums at approximately 650 nm according to their extinction coefficient that may be selectively incorporated into the present antenna dye package to reduce the power level initiating a color change in the optically-activated colorant(s) include, but are in no way limited to, dye 724 (3H-Indolium, 2-[5-(1,3-dihydro-3,3-dimethyl-1-propyl-2H-indol-2-ylidene)-1,3-pentadienyl]-3,3-dimethyl-1-propyl-, iodide) (λ max=642 nm), dye 683 (3H-Indolium, 1-butyl-2-[5-(1-butyl-1,3-dihydro-3,3-dimethyl-2H-indol-2-ylidene)-1,3-pentadienyl]-3,3-dimethyl-, perchlorate (λ max=642 nm), dyes derived from phenoxazine such as Oxazine 1 (Phenoxazin-5-ium, 3,7-bis(diethylamino)-, perchlorate) (λ max=645 nm), available from "Organica Feinchemie GmbH Wollen." Appropriate antenna dyes applicable to the present exemplary system and method may also include but are not limited to phthalocyanine dyes with light absorption maximum at/or in the vicinity of 650 nm.

Radiation absorbing antenna dyes having absorbance maximums at approximately 780 nm that may be incorporated into the present antenna dye package include, but are in no way limited to, many indocyanine IR-dyes such as IR780 iodide (Aldrich 42,531-1) (1) (3H-Indolium, 2-[2-[2-chloro-3-[(1,3-dihydro-3,3-dimethyl-1-propyl-2H-indol-2-ylidene) ethylidene]-1-cyclohexen-1-yl]ethenyl]-3,3-dimethyl-1-propyl-, iodide (9Cl)), IR783 (Aldrich 54,329-2) (2) (2-[2-[2-Chloro-3-[2-[1,3-dihydro-3,3-dimethyl-1-(4-sulfobutyl)-2Hindol-2-ylidene]-ethylidene]-1-cyclohexen-1-yl]-ethenyl]-3,3-dimethyl-1-(4-sulfobutyl)-3H-indolium hydroxide, inner salt sodium salt). Additionally, low sensitivity/higher stability dyes having absorbance maximums at approximately 780 nm may be used including, but in no way limited to NIR phthalocyanine or substituted phthalocyanine dyes such as Cirrus 715 dye from Avecia, YKR186, and YKR3020 from Yamamoto chemicals Similarly, high sensitivity/lower stability radiation absorbing antenna dyes having absorbance maximums at approximately 808 nm that may be incorporated into the present optically-activated colorant(s) include, but are in no way limited to, Indocyanine dyes such as 3H-Indolium, 2-[2-[2-chloro-3-[(1,3-dihydro-1,3,3-trimethyl-2H-indol-2-ylidene) ethylidene]-1-cyclopenten-1-yl]ethenyl]-1,3,3-trimethyl-, salt with 4-methylbenzenesulfonic acid (1:1) (9Cl), (Lambda max—797 nm), CAS No. 193687-61-5, available from "Few Chemicals GMBH" as S0337; 3H-Indolium, 2-[2-[3-[(1,3-dihydro-1,3,3-trimethyl-2H-indol-2-ylidene) ethylidene]-2-[(1-phenyl-1H-tetrazol-5-yl)thio]-1-cyclohexen-1-yl]ethenyl]-1,3,3-trimethyl-, chloride (9Cl), (Lambda max—798 nm), CAS No. 440102-72-7 available from "Few Chemicals GMBH" as S0507; 1H-Benz[e]indolium, 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-chloride (9Cl), (Lambda max—813 nm), CAS No. 297173-98-9 available from "Few Chemicals GMBH" as S0391; 1H-Benz[e]indolium, 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, salt with 4-methylbenzenesulfonic acid (1:1) (9Cl), (Lambda max—813 nm), CAS No. 134127-48-3, available from "Few Chemicals GMBH" as S0094, also known as Trump Dye or Trump IR; and 1H-Benz[e]indolium, 2-[2-[2-chloro-3-[(3-ethyl-1,3-dihydro-1,1-dimethyl-2Hbenz[e]indol-2-ylidene)ethylidene]-1-cyclohexen-1-yl]ethenyl]-3-ethyl-1,1-dimethyl-, salt with 4-methylbenzenesulfonic acid (1:1) (9Cl) (Lambda max—816 nm), CAS No. 460337-33-1, available from "Few Chemicals GMBH" as S0809.

Moreover, species absorbing IR radiation as high as 10.6 um (10,600 nm) that may be selectively incorporated into the present optically-activated colorant(s) are not necessarily dyes (many of them could be colorless). Rather, a number of organic substances may have stretching or bending vibrational IR absorption bands in this region. Still IR-absorbing efficiency of the optically-activated colorant(s) toward 10.6 um radiation may be significantly enhanced if the optically-activated colorant(s) contain species with functional groups highly absorptive in this region. Examples of the species with possible strong absorption band in vicinity of 10.6 μm include, but are not limited to, some organic species with structures containing vinyl group (—CH═CH2); some species with —SH (thiol) group; and species with covalent phosphates (R—O)3P═O.

Figure 2:
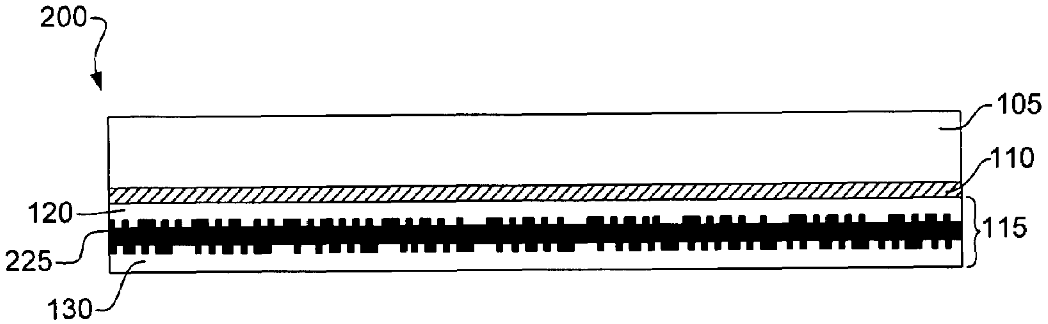
FIG. 2 is a cross-sectional diagram of an exemplary optical disc, according to principles described herein.

Referring now to FIG. 2, another exemplary optical disc (200) may include a double layer optical data storage medium (225) having pits and/or bumps, or the capacity to form such data storage features, distributed over two metal surfaces. A laser in an optical disc drive may be configured to focus separately on each of the two metal surfaces and read the digital data stored thereon.

An outer data layer of the optical data storage medium (225) may include semi-reflective gold. The semi-reflective gold may reflect light from a laser focused on the outer data layer to allow an optical pickup of an optical disc drive to read digital data stored on the outer data layer of the optical disc. The semi-reflective gold may also permit the passage of light from a laser that is focused on the inner data layer to allow the reading or writing of digital data on the inner data layer of the optical disc.

Figure 3:
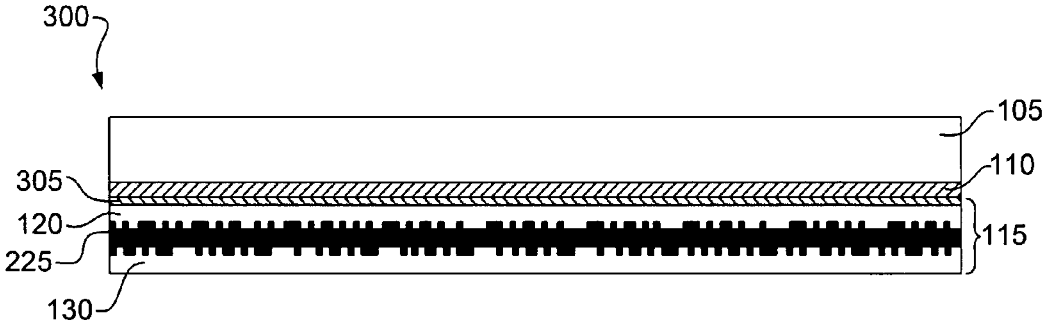
FIG. 3 is a cross-sectional diagram of an exemplary optical disc, according to principles described herein.

Referring now to FIG. 3, another exemplary optical disc (300) is shown. In some embodiments, the optically-activated colorant may be applied to the optical disc (300) separately from the adhesive layer (110), but still between the two plates (105, 115) of the disc (300). This may be advantageous in embodiments where the optically-activated colorant does not mix well with a desired adhesive or does not include sufficient adhesive properties on its own. The optical disc (300) of this embodiment is shown with an optically-activated colorant layer (305) disposed upon the interior surface second plate (115). The adhesive layer (110) may be transparent and permit a clear view of the optically-activated colorant layer (305).

Figure 4:
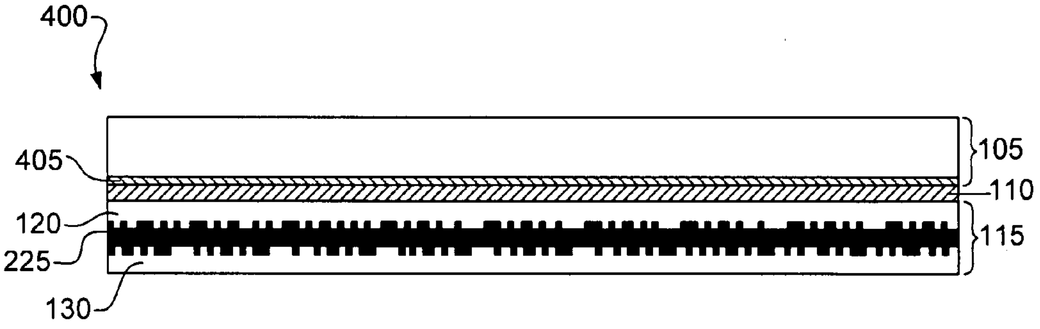
FIG. 4 is a cross-sectional diagram of an exemplary optical disc, according to principles described herein.

Referring now to FIG. 4, another exemplary optical disc (400), similar to the optical disc (300, FIG. 3) is shown. Instead of depositing the optically-activated colorant layer on the second plate (115), the optical disc (400) of this embodiment is shown with an optically-activated colorant layer (405) disposed upon the interior surface of the first plate (105). Thus, as seen from FIGS. 3 and 4, the optically-activated colorant layer (305, 405) can be disposed on either side of an adhesive layer (110).

Figure 5:
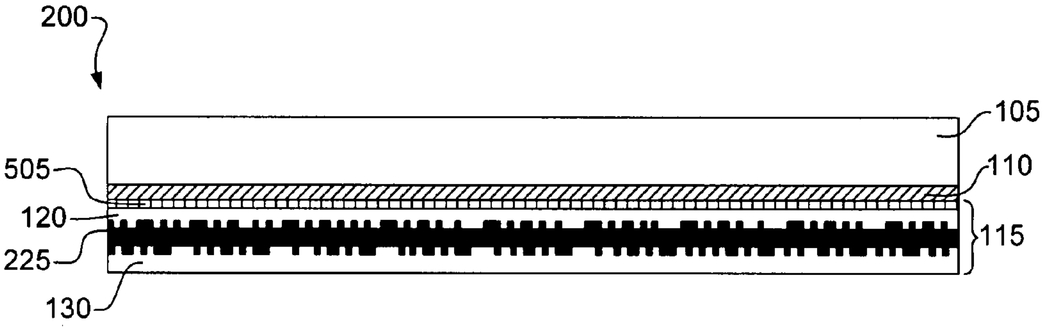
FIG. 5 is a cross-sectional diagram of an exemplary optical disc, according to principles described herein.

Referring now to FIG. 5, another exemplary optical disc (300) is shown. The optical disc (300) includes a layer of opaque material (505) deposited on the second plate (115). The opaque material (505) may provide increased contrast to the optically-activated colorant in the adhesive layer (110) and further reduce the holographic effect caused by reflections from the metallic optical data storage medium (115). In some embodiments, the opaque material may provide a desired color for contrast with the optically-activated colorant.

Exemplary System

Figure 6:
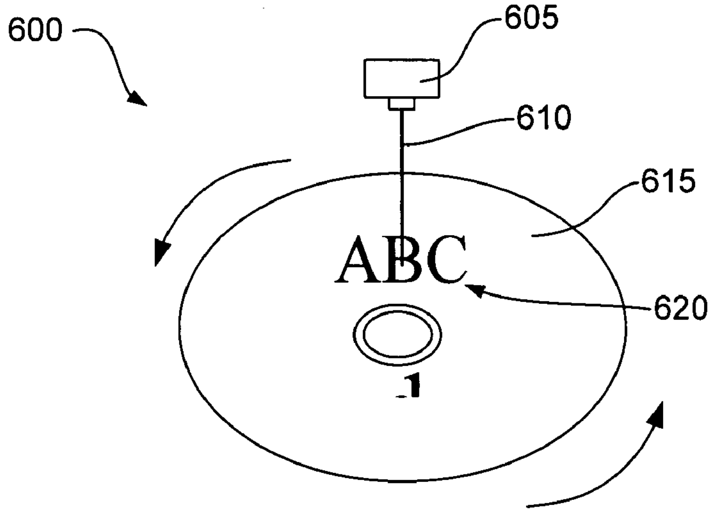
FIG. 6 is a diagram of an exemplary system for labeling an optical disc, according to principles described herein.

Referring now to FIG. 6, an exemplary system (600) for labeling an optical disc is shown. The system (600) includes an optical disc (615), and an optical write module (605).

The optical disc (615) includes an optically-activated colorant disposed between a first plate and a second plate. In some embodiments, the optically-activated colorant may include a portion or all of an adhesive layer that bonds the first plate to the second plate in the optical disc (615). The first and second plates may be substantially transparent.

The optically-activated colorant is configured to become visibly altered in response to exposure to a light source, such as a laser beam (610), of the optical write module (605). Thus, by selectively directing the laser beam (610) through the first plate, a visible label pattern (620) may be created on the optical disc (615).

The optical write module (605) may be configured to provide laser energy to the optical disc (615) of a specified wavelength and/or intensity. In some embodiments, the optical write module may be configured to vary the wavelength or intensity of the laser beam (610) to selectively visibly alter different optically-activated colorants that are responsive to different wavelengths of light. In this way, some embodiments of the optical write module (605) may be configured to create labels on the optical disc having primary and/or composite colors.

Furthermore, in some embodiments, the optical write module (605) may be configured to write digital data to an optical data storage medium in the second plate of the optical disc (615). In such embodiments, the optical write module (605) may include one setting of light wavelength or intensity to write data on one side of the optical disc (615) and another one or more different settings of light wavelength or intensity for creating a label on another side of the optical disc (615).

The optical write module (605) may further be configured to progressively move the laser beam (610) radially toward or away from a center of the optical disc (615) as the optical disc (615) is selectively spun.

Figure 7:
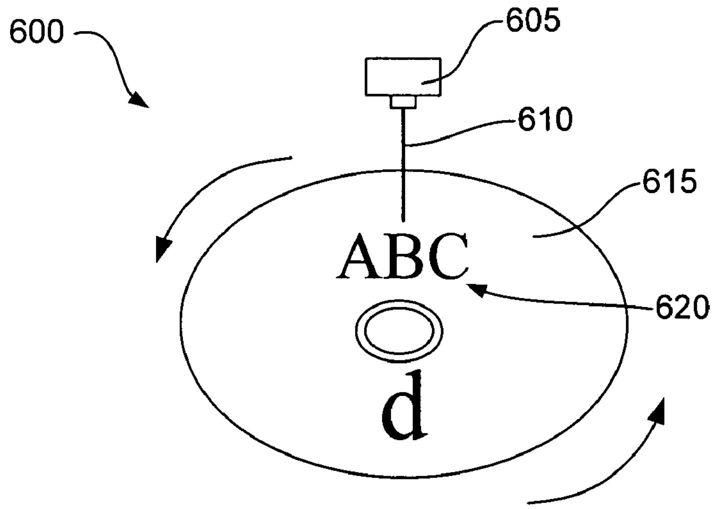
FIG. 7 is a diagram of an exemplary system for labeling an optical disc, according to principles described herein.

Referring now to FIG. 7, the optical disc (615) of FIG. 6 is shown after the optical write module (605) has moved radially toward the outward edge of the selectively spun optical disc (615) and completed the visible label pattern (620).

Exemplary Methods

Figure 8:
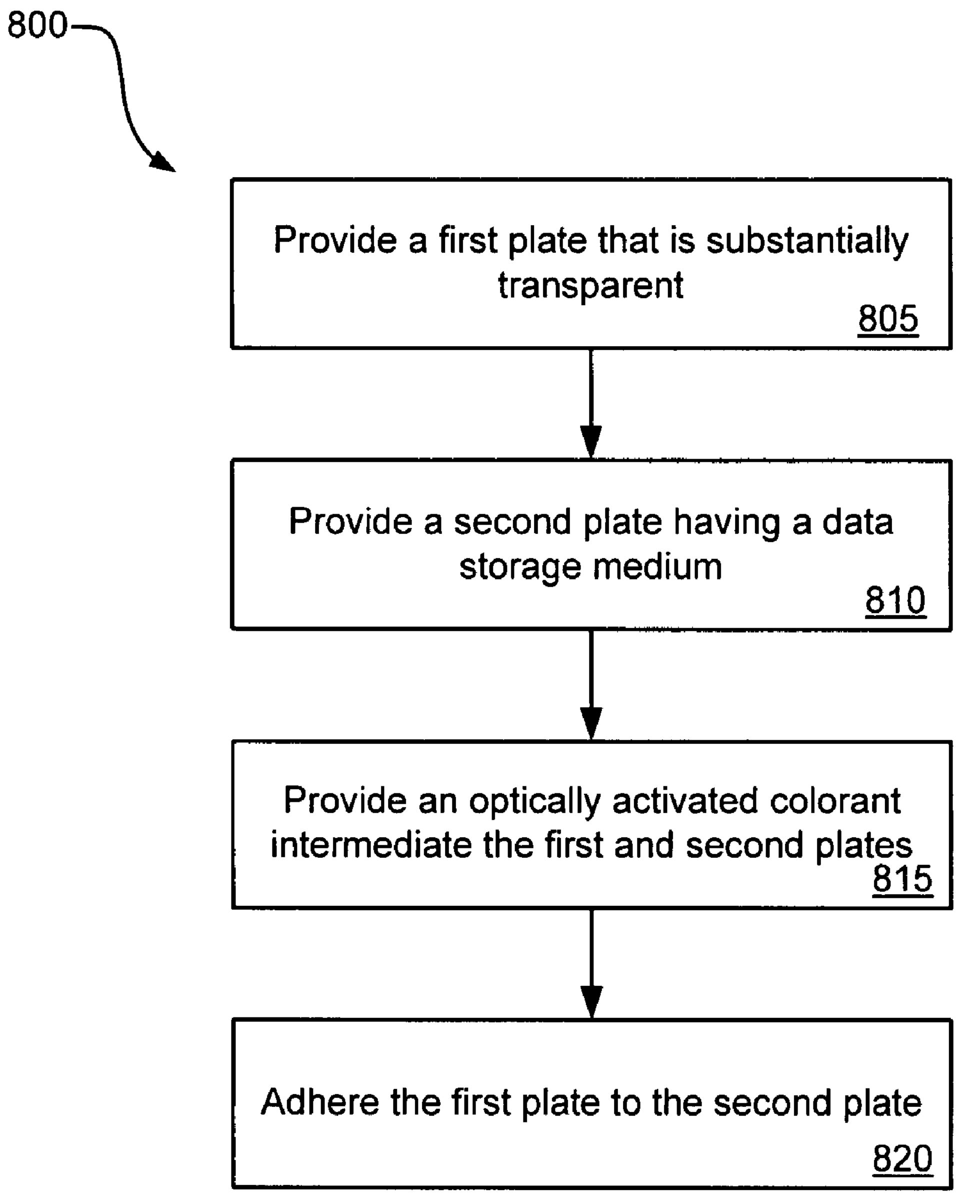
FIG. 8 is a flowchart illustrating an exemplary method of fabricating an optical disc, according to principles described herein.

Referring now to FIG. 8, a flowchart illustrating an exemplary method (800) of fabricating an optical disc is shown. The method (800) includes the steps of providing (step 805) a first plate that is substantially transparent. The plate may be made out of a polycarbonate plastic material. The plate may have a substantially circular geometry. The method (800) also includes the step of providing (step 810) a second plate having a data storage medium. The data storage medium may be an optical data storage medium such as those typical in the art. The data storage medium may be double-layered or single-layered.

An optically-activated colorant is also provided (step 815) between the first and second plates. The optically-activated colorant may be configured to receive light having a specified wavelength and/or intensity from a laser beam selectively directed through the first plate. The light received through the first plate in the optically-activated colorant may visibly alter the colorant to provide a label or design for the optical disc which may be viewed through the exterior face of the first plate.

The first plate is then adhered (step 820) to the second plate. In some embodiments, an adhesive material containing the optically-activated colorant may be used to bond the first plate to the second plate. The first plate and the second plate may have substantially similar geometries, to provide for easy overlay. The adhesive material may also include a lacquer substance.

The step of adhering (step 820) the first plate to the second plate may include compressing the first and second plates together to provide a firm bond. Furthermore, the step of adhering (step 820) the first plate to the second plate may include curing the bond between the first and second plates under infrared light or other radiated energy or heat. In some embodiments, radiated energy used to cure the bond between the first and second plates may not have the wavelength or intensity that visibly alters the optically-activated colorant. In this way, the process of curing the bond between the first and second plates need not affect the process of creating a label for the optical disc.

Figure 9:
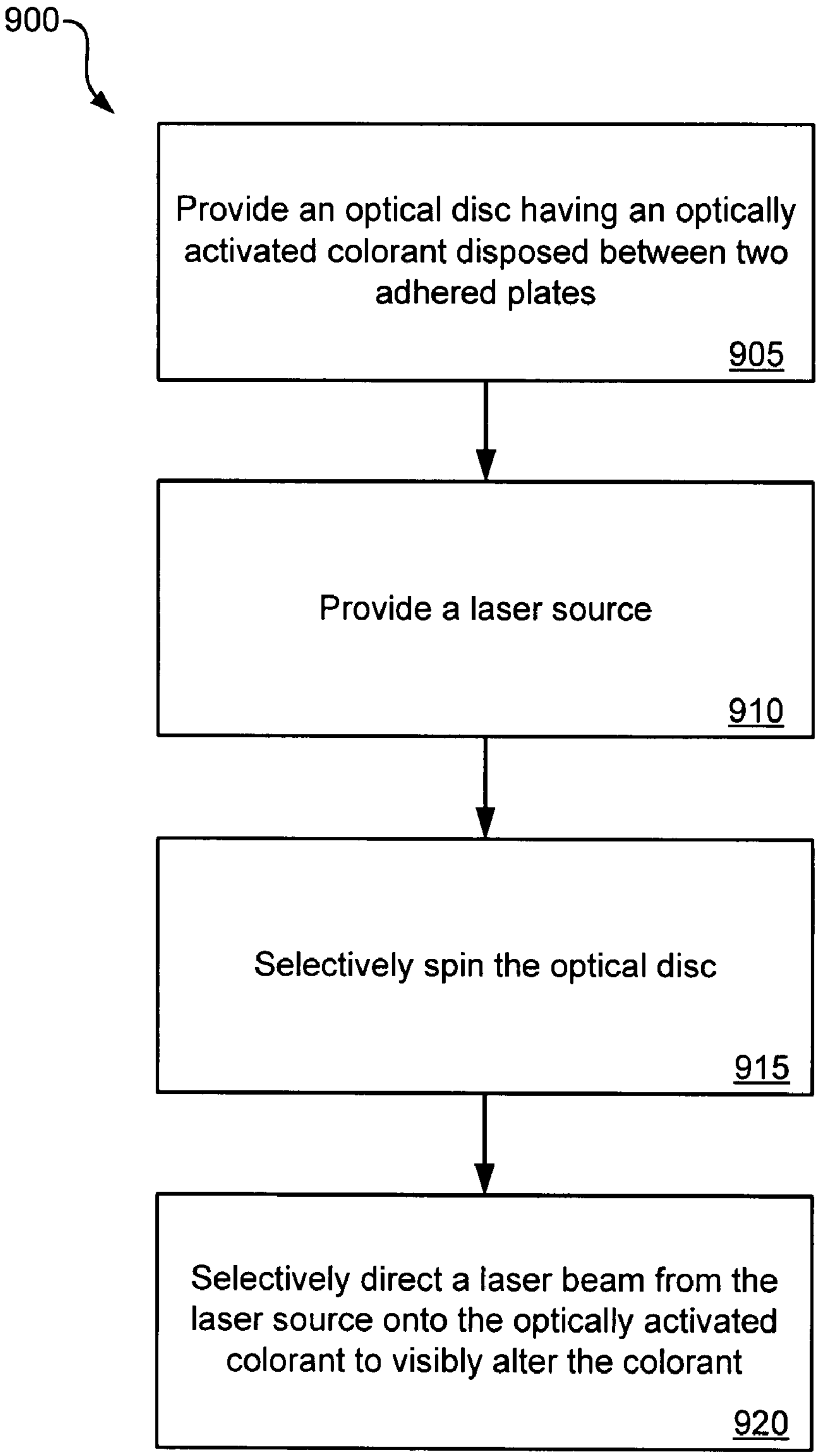
FIG. 9 is a flowchart illustrating an exemplary method of labeling an optical disc, according to principles described herein.

Referring now to FIG. 9, a flowchart is shown that illustrates an exemplary method (900) of labeling an optical disc. The method (900) includes the step of providing (905) an optical disc having an optically-activated colorant disposed between two adhered plates. The plates may be substantially transparent, and at least one of the plates may include an optical data storage medium.

The method (900) further includes the step of providing (910) a laser source. The laser source may be part of an optical data drive configured to receive the apparatus and read from the optical data storage medium. In some embodiments, the laser source may be configured to write to both the optical data storage medium and the optically-activated colorant.

After the optical disc and the laser source have been provided (steps 905, 910, respectively), the optical disc is selectively spun (step 915). A motor in an optical disc drive may selectively spin the optical disc about a center axis.

As the optical disc is selectively spun (step 915), the method (900) further includes the step of selectively directing (step 920) a laser from the laser source onto the optically-activated colorant to visibly alter the colorant. The laser source may be configured to provide a certain wavelength and/or intensity of radiated energy to the optically-activated colorant that causes the visible alteration in the colorant.

In some embodiments, the method (900) may further include the step of translating the laser beam from the laser source radially as the optical disc is selectively spun (step 915). In such embodiments, the laser beam may be translated from a central axis of the optical disc toward an outer edge or vice versa.

Additionally, some embodiments of the method (900) may include the step of repeating the steps of selectively spinning (step 915) the optical disc and selectively directing (step 920) a laser beam onto the optically-activated colorant, while altering the wavelength and/or intensity of the laser beam with each iteration.

Additionally, some embodiments of the method (900) may include varying the intensity of the laser beam as the disc is spun and the laser beam is selectively directed onto the optically-activated colorant, thereby activating one or more colorant subcomponents.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical disc, comprising:
- a first plate;
- a second plate adhered to said first plate; and
- an optically-activated colorant disposed between said first and second plates;
- wherein said optically-activated colorant forms at least a portion of an adhesive layer adhering said first and second plates.

2. The optical disc of claim 1, wherein said first plate is substantially transparent.

3. The optical disc of claim 1, wherein said second plate comprises an optical data storage medium.

4. The optical disc of claim 1, wherein said optically-activated colorant comprises a radiation-curable polymer matrix;
- wherein said radiation curable polymer matrix includes an acidic activator species and a low-melting eutectic of a leuco-dye insoluble and uniformly distributed in said matrix.

5. The optical disc of claim 1, wherein at least one of said first and second plates comprises a polycarbonate material.

6. The optical disc of claim 1, wherein said optically-activated colorant is configured to visibly alter appearance upon receiving light through said first plate.

7. The optical disc of claim 6, wherein said visible alteration of appearance is selected from the group consisting of: changes in opacity, changes in transparency, changes in hue, changes in brightness, and combinations thereof.

8. The optical disc of claim 6, wherein said optically-activated colorant is configured to visibly alter its appearance only when said light comprises a particular range of wavelengths and has at least a minimum intensity.

9. The optical disc of claim 1, wherein said first and second plates comprise a substantially circular geometry.

10. The optical disc of claim 1, wherein said first and second plates comprise substantially congruent geometries.

11. A method of fabricating an optical disc, said method comprising:
- providing a first plate that is substantially transparent;
- providing a second plate having a data storage medium; and
- providing an optically-activated colorant between said first and second plates.

12. The method of claim 11, further comprising adhering said first plate to said second plate.

13. The method of claim 12, wherein said adhering said first plate to said second plate is accomplished using an adhesive material comprising said optically-activated colorant.

14. The method of claim 12, wherein said adhering said first plate to said second plate further comprises pressing said first and second plates together.

15. The method of claim 12, wherein said adhering said first plate to said second plate further comprises curing a bond between said first and second plates.

16. The method of claim 11, wherein said optically-activated colorant is configured to alter its appearance only upon receiving light of a particular range of wavelengths and at least a particular intensity.

17. A method of labeling an optical disc, said method comprising:
- providing an optical disc having an optically-activated colorant disposed between first and second plates, said plates being adhered to each other;
- selectively directing a laser beam from a laser source onto said optically-activated colorant to visibly alter said colorant,
- wherein said second plates includes a data storage medium.

18. The method of claim 17, further comprising selectively spinning said optical disc and selectively directing said laser beam from said laser source onto said colorant with an optical disc drive.

19. The method of claim 17, wherein said optically-activated colorant is configured to visibly alter its appearance only upon receiving a laser beam of a particular range of wavelengths and at least a particular intensity.

20. The method of claim 17, wherein said laser beam comprises wavelengths within said particular range of wavelengths and said laser beam having at least the particular intensity.

* * * * *